(12) United States Patent
Lev et al.

(10) Patent No.: US 7,996,499 B2
(45) Date of Patent: Aug. 9, 2011

(54) INTELLIGENT PROCESSING OF WEB SERVICE REQUESTS FOR BACKWARD COMPATIBILITY

(75) Inventors: Boaz Lev, Redmond, WA (US); Michael Shawn Garlick, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 12/479,858

(22) Filed: Jun. 8, 2009

(65) Prior Publication Data
US 2010/0312859 A1 Dec. 9, 2010

(51) Int. Cl.
G06F 15/16 (2006.01)
G06F 9/44 (2006.01)
(52) U.S. Cl. ......... 709/220; 709/224; 709/228; 719/310
(58) Field of Classification Search .................. 709/219, 709/227, 231, 206, 223, 229; 707/10; 719/310
See application file for complete search history.

(56) References Cited

U.S. PATENT DOCUMENTS

| | | | | |
|---|---|---|---|---|
| 7,117,504 | B2* | 10/2006 | Smith et al. | 719/328 |
| 7,353,464 | B1* | 4/2008 | Kundu et al. | 715/853 |
| 7,475,403 | B2* | 1/2009 | Childress et al. | 719/313 |
| 7,577,964 | B2* | 8/2009 | Beringer et al. | 719/328 |
| 2006/0136422 | A1* | 6/2006 | Matveief et al. | 707/10 |
| 2007/0022007 | A1* | 1/2007 | Lawe | 705/14 |
| 2007/0067479 | A1* | 3/2007 | Angelov | 709/231 |
| 2007/0100967 | A1 | 5/2007 | Smith et al. | |
| 2007/0220115 | A1* | 9/2007 | Srinivasan et al. | 709/219 |
| 2009/0083211 | A1 | 3/2009 | Sinha et al. | |

OTHER PUBLICATIONS

Nberardi, "NET URL Rewriter and Reverse Proxy", Retrieved at <<http://code.msdn.microsoft.com/urlrewriter/Wiki/View.aspx?title=Home&version=6>>, Jan. 31, 2008, pp. 1-2.

Joshi, Dipesh, "Convert Existing asmx .Net Web Service to WCF Service in .Net 3.0/3.5", Retrieved at <<http://archdipesh.blogspot.com/2008/02/convert-existing-asmx-net-web-service.html>>, Feb. 19, 2008, pp. 1-5.
"Creating a WCF Service that Consumes an ASMX Service", Retrieved at <<http://social.msdn.microsoft.com/Forums/en-US/wcf/thread/bdbbf515-7ea9-452a-b227-deda3aadcb89>>, Apr. 29, 2009, pp. 1-6.
"Alligator Tags", Retrieved at <<http://www.alligatortags.com/alligatortags-4-19-2008.html>>, Apr. 19, 2008, pp. 1-15.
Lippard, Philip, "A New Generation of URL Rewriters ?", Retrieved at <<http://www.codeproject.com/KB/aspnet/nUrlRewriter1.aspx>>, Apr. 18, 2008, pp. 20.
Birkby, Richard, "URL Rewriting with ASP.NET", Retrieved at <<http://www.codeproject.com/KB/aspnet/urlrewriter.aspx?fid=4228&df=90&mpp=25&noise=3&sort=Position&view=Quick&fr=101>>, Jul. 3, 2002, pp. 17.
Kraak, Tom, "DNN URL Rewriter on Steroids", Retrieved at <<http://seablick.com/blog/91/dnn-url-rewriter-on-steroids.aspx>>, Jan. 16, 2008, pp. 1-2.
Powell, Matt, "Web Services, Opaque Data, and the Attachments Problem", Retrieved at <<http://msdn.microsoft.com/en-us/library/ms996462.aspx>>, Jun. 2004, pp. 1-9.

* cited by examiner

*Primary Examiner* — Khanh Q Dinh
(74) *Attorney, Agent, or Firm* — Hope Baldauff Hartman, LLC (57) ABSTRACT

A Web service request is received that is constructed according to a first Web service technology and that targets an activation file constructed according to the first Web service technology. When the Web service request is received, it is modified to target an activation file constructed according to a second Web service technology. Binding properties associated with the Web service request and binding properties supported by a targeted Web service may also be identified. Binding properties for use in forwarding the Web service request to the Web service are then selected based upon the binding properties associated with the Web service request and the binding properties supported by the Web service. The Web service request is then forwarded to the Web service using a binding having the selected binding properties.

17 Claims, 5 Drawing Sheets

INTELLIGENT PROCESSING OF WEB SERVICE REQUESTS FOR BACKWARD COMPATIBILITY

BACKGROUND

Many types of computer programs and World Wide Web ("Web") sites utilize Web service technologies. Web service technologies allow client programs to access functionality provided by compatible Web services. The functionality exposed by the Web services can be accessed remotely through a data communications network, such as the Internet.

The Web service technologies utilized to implement Web services and compatible client programs are frequently upgraded. Consequently, it may become necessary for a software developer to maintain a Web service and one or more compatible client programs for several different versions of a Web service technology. Alternately, the developer might upgrade the Web service and the client programs to the newer version of the Web service technology. However, each of these alternatives can be costly and time consuming for the developer.

Newer Web service technologies typically provide a mechanism for handling Web service requests constructed according to an older version of the Web service technology. In some implementations, the Web service converts Web service requests compatible with an older version of a Web service technology for compatibility with a newer version of the Web service technology prior to processing the requests. Conversion of Web service requests in this manner, however, can impose significant undesirable processing overhead.

It is with respect to these and other considerations that the disclosure made herein is presented.

SUMMARY

Technologies are described herein for processing Web service requests. In particular, through an implementation of the concepts and technologies presented herein, Web service requests constructed according to an older version of a Web service technology (which may be referred to herein as a "legacy" Web service technology) can be processed without modifying a legacy Web service client utilized to construct the request. Moreover, such requests can be handled in a manner that minimizes the processing performed on the Web service request prior to forwarding the request to the target Web service, such as converting the Web service request for compatibility with a newer version of the Web service technology.

According to one embodiment, a Web service client constructs a Web service request in accordance with a legacy Web service technology. The Web service request targets a Web service that is also compatible with the legacy Web service technology. For instance, the Web service request might target an activation file constructed in accordance with the legacy Web service technology. As an example, in one implementation the Web service request and the targeted activation file are constructed in accordance with the Active Server Methods X ("ASMX") Web service technology from MICROSOFT CORPORATION of Redmond, Wash.

In order to process a Web service request constructed with a legacy Web service technology, a Web service is implemented using a newer Web service technology that is capable of producing the same results as the Web service compatible with the legacy Web service technology given the same parameters. For instance, in one embodiment the Web service is constructed using the Windows Communication Foundation ("WCF") Web service technology.

When a Web service request is received that has been constructed using a legacy Web service technology, the Web service request is modified so that it targets the Web service implemented using the newer Web service technology. For instance in one implementation, if the Web service request targets an activation file for the legacy Web service technology, the Web service request is modified such that it targets an activation file for the Web service constructed according to the newer Web service technology.

According to other aspects, Web service requests may be modified in a manner that minimizes the processing performed on the Web service request prior to forwarding the request to the target Web service. In particular, when a Web service request is received, one or more binding properties associated with the Web service request are identified. The binding properties define aspects of a binding between the Web service request and the Web service. For instance, an encoding type for the Web service request, a message version utilized to format the Web service request, and a transport utilized to transmit the Web service request may be identified. Binding properties supported by the target Web service are also identified.

Binding properties for use when forwarding the Web service request to the target Web service are then selected based upon the binding properties associated with the Web service request and supported by the target Web service. In one implementation, the binding properties are selected as to minimize the processing performed on the Web service request prior to forwarding the Web service request to the target Web service. For instance, the binding properties might be selected in order to avoid re-encoding the Web service request or to avoid a conversion of the Web service request to a different message version. Once the binding properties have been selected, the binding properties are utilized to forward the Web service request to the target Web service.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for processing Web service requests. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for optimized routing will be presented.

Figure 1:
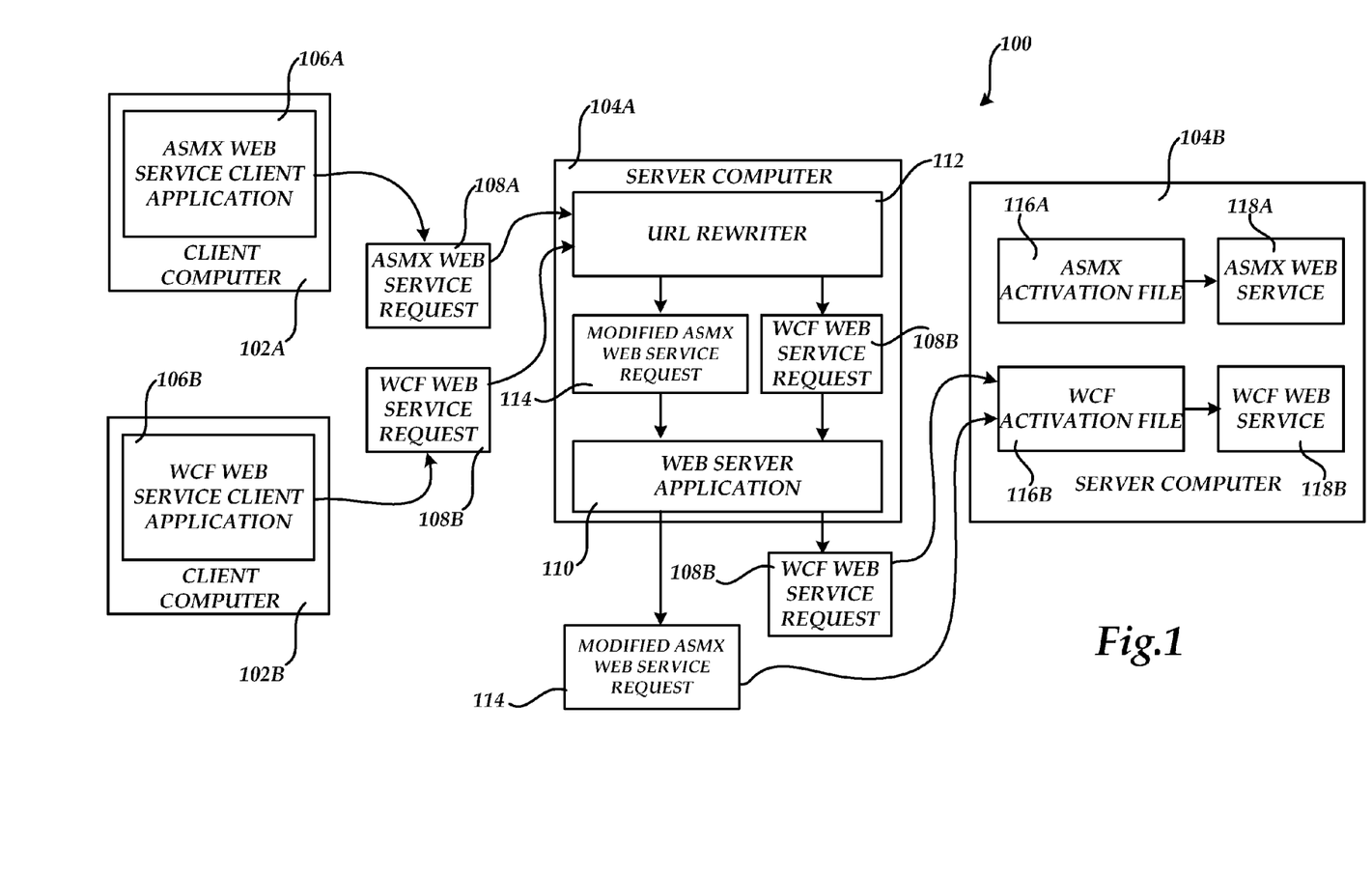
FIG. 1 is a computer network and software architecture diagram that shows aspects of an illustrative operating environment and several software components presented herein.

Turning now to FIG. 1, details will be provided regarding an illustrative operating environment for the embodiments presented herein. In particular, FIG. 1 is a computer network and software architecture diagram that shows aspects of an illustrative operating environment and several software components presented herein. FIG. 1 shows several client computers 102A-102B that are configured with Web service client applications operative to transmit Web service requests to one or more Web services. As discussed briefly above, Web service technologies allow client programs to access functionality provided by compatible Web services. The functionality exposed by the Web services can be accessed remotely through a data communications network, such as the Internet. Accordingly, it should be appreciated that the computing systems and software components illustrated in FIG. 1 may communicate with one another through the use of one or more data communications networks (not shown in FIG. 1). Moreover, although several server computers are illustrated in FIG. 1, it should be appreciated that more or fewer computer systems may be utilized than illustrated in FIG. 1 and described herein.

According to one implementation, the client computers 102A-102B are configured to execute Web service client applications that have been programmed according to different Web service technologies. For instance, as shown in FIG. 1, the client computer 102A is configured to execute an Active Server Methods X ("ASMX") Web service client application 106A. The ASMX Web service client application 106A has been programmed for compatibility with the ASMX Web service technology from MICROSOFT CORPORATION of Redmond, Wash. Accordingly, the ASMX Web service client application 106A issues Web service requests, such as the ASMX Web service request 108A, that are compatible with the ASMX Web service technology. The ASMX Web service technology may also be referred to herein as a legacy Web service technology as this Web service technology has been superseded by the WINDOWS Communication Foundation ("WCF") Web service technology, also from MICROSOFT CORPORATION.

As also shown in FIG. 1, the client computer 102B is configured in one embodiment to execute a WCF Web service client application 106B that has been programmed for compatibility with the WCF technology. As such, the WCF Web service client application 106B issues Web service requests, such as the WCF Web service request 108B, that are compatible with WCF.

It should be appreciated that the ASMX Web service request 108A targets a compatible Web service, such as the ASMX Web service 118A. Likewise, the WCF Web service request 108B targets a WCF Web service 118B. The ASMX Web service request 108A targets an ASMX activation file 116A. The ASMX activation file 116A is a file that allows a Web server application 110 to identify the particular ASMX Web service 118A to handle a particular ASMX Web service request 108A. Similarly, the WCF Web service request 108B may target a WCF activation file 116B. The WCF activation file 116B allows the Web server application 110 to determine the particular Web service, such as the WCF Web service 118B, for handling the WCF Web service request 108B.

It should be appreciated that, in one embodiment, the WCF Web service 118B is programmed to provide the same results as the ASMX Web service 118A given the same set of inputs. However, the WCF Web service 118B is programmed for compatibility with the WCF technology while the ASMX Web service 118A is programmed for compatibility with the ASMX Web service technology. The embodiments presented herein describe mechanisms that permit the WCF Web service 118B to process the ASMX Web service request 108A in an efficient manner. This allows a developer to discontinue maintenance of the ASMX activation file 116A and the ASMX Web service 118A while still servicing Web service requests from the ASMX Web service client application 106A. Additional details regarding the technologies provided herein for enabling the WCF Web service 118B to handle the ASMX Web service request 108A will be provided below.

According to one embodiment presented herein, a Uniform Resource Locator ("URL") rewriter 112 is provided. As will be described below, the URL rewriter 112 provides functionality for modifying Web service requests that have been constructed using a legacy Web service technology to target a compatible Web service implemented using a newer Web service technology. For instance, in one implementation, if the URL rewriter 112 receives a Web service request that targets an activation file for a legacy Web service technology, the Web service request will be modified by the URL rewriter 112 such that it targets an activation file for the Web service constructed according to the newer Web service technology. FIG. 1 illustrates this mechanism according to one particular implementation.

The implementation shown in FIG. 1, the URL rewriter 112 operates in conjunction with a Web server application 110. In particular, the URL rewriter 112 operates in conjunction with a processing pipeline utilized by the Web server application 110. In this manner, the URL rewriter 112 can process Web service requests prior to the processing performed by the Web server application 110. The URL rewriter 112 can process incoming Web service requests, such as the ASMX Web service request 108A and the WCF Web service request 108B, to target an appropriate Web service.

In one illustrative embodiment, the URL rewriter 112 receives an ASMX Web service request 108A from the ASMX Web service client application 106A. As discussed above, the ASMX Web service request 108A includes a request for the ASMX Web service 118A by targeting the ASMX activation file 116A. When the URL rewriter 112 receives such a Web service request, the URL rewriter 112 is configured to modify the ASMX Web service request 108A to target an activation file for a Web service constructed according to a newer Web service technology. In particular, in the example shown in FIG. 1, the URL rewriter 112 modifies the ASMX Web service request 108A to form a modified ASMX Web service request 114 that targets the WCF activation file 116B. The modified ASMX Web service request 114 is then provided to the Web server application 110 which, in turn, provides the modified ASMX Web service request 114 to the WCF activation file 116B. In this way, the ASMX Web service request 108A is modified such that it is serviced by the WCF Web service 118B.

As described briefly above, the URL rewriter 112 may also receive a WCF Web service request 108B. If such a request is received, the URL rewriter 112 takes no action with respect to the WCF Web service request 108B. Instead, the WCF Web service request 108B is passed directly to the Web server application 110 which, in turn, provides the WCF Web service request 108B to the WCF activation file 1116B. In this way, the WCF Web service request 108B is processed by the WCF Web service 118B in a typical fashion.

Based on the foregoing it should be appreciated that the URL rewriter 112 provides functionality for modifying an ASMX Web service request 108A or another type of legacy Web service request to target a WCF Web service 118B or another Web service constructed using a newer Web service technology. However, as described above, although the WCF technology provides functionality for handling a legacy Web service request, the processing performed by the WCF technology may be inefficient. Accordingly, the embodiments presented herein also include a mechanism for processing legacy Web service requests in a more efficient manner. Details regarding this mechanism are provided below with respect to FIGS. 3-4.

It should be appreciated that although FIG. 1 shows a server computer 104A executing the URL rewriter 112 and the Web server application 110 and a server computer 104B executing the Web services 118A and 118B, the functionality shown in FIG. 1 may be deployed across a single computer or more computers than shown in FIG. 1. It should also be appreciated that other types of architectures other than the one illustrated in FIG. 1 may be utilized to embody the technologies and concepts described herein.

Figure 2:
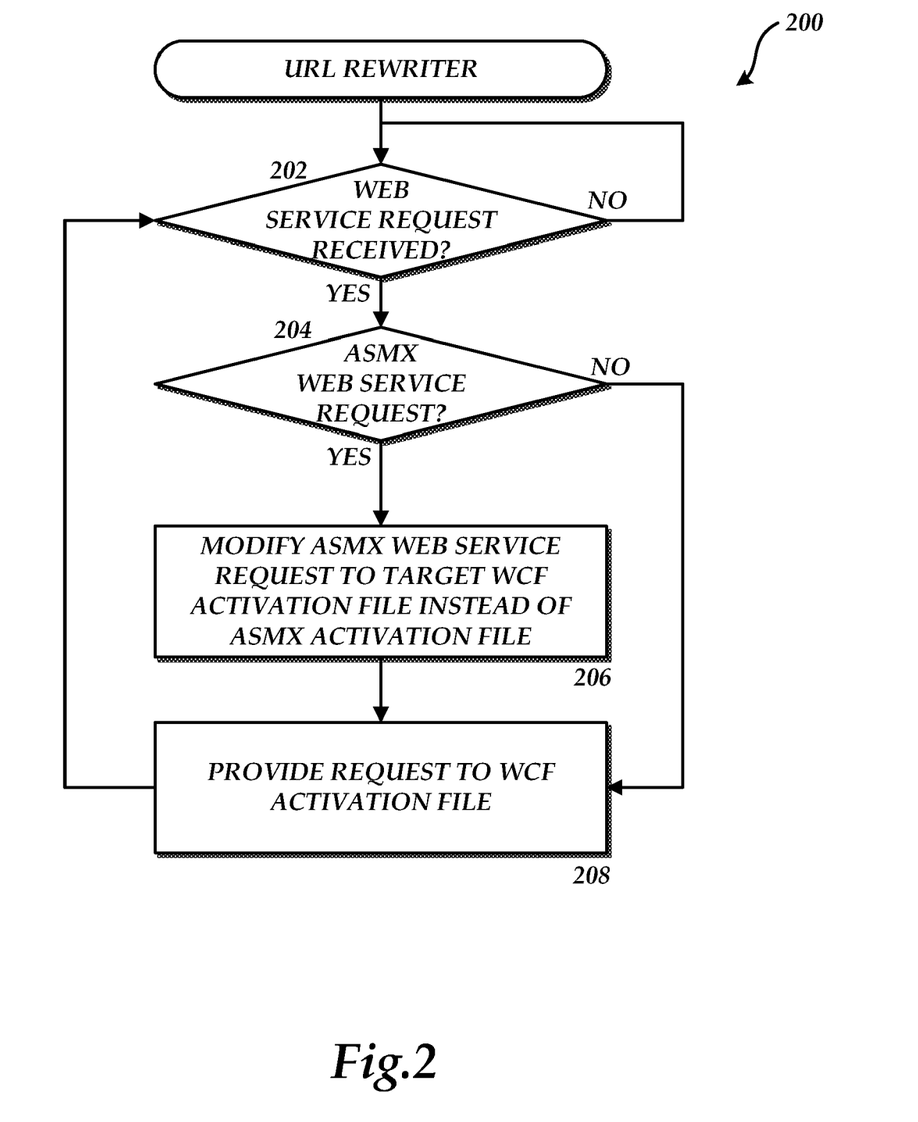
FIG. 2 is a flow diagram showing aspects of the operation of a uniform resource locator ("URL") rewriter provided hereby and utilized in embodiments disclosed herein.

Referring now to FIG. 2, additional details will be provided regarding the embodiments presented herein for processing Web service requests. In particular, FIG. 2 is a flow diagram showing a routine 200 that illustrates aspects of the operation of the URL rewriter 112 according to one embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the URL rewriter 112 determines whether a Web service request has been received. If a Web service request has not been received, the routine 200 proceeds to operation 202, where another such determination is made. If a Web service request has been received, the routine 200 proceeds to operation 204 where the URL rewriter 112 determines whether the received Web service request was an ASMX Web service request, such as the ASMX Web service request 108A.

If the received Web service request is not an ASMX Web service request 108A, the routine 200 branches to operation 208 where the URL rewriter 112 provides the received Web service request to the Web server application 110. In embodiments, the URL rewriter 112 does nothing with the request if it is not an ASMX Web service request. As discussed above, the Web server application 110 handles the request in a normal manner as appropriate based on the request type, including providing the request to WCF for handling. From operation 208, the routine 200 proceeds to operation 202, described above.

If, at operation 204, the URL rewriter 112 determines that the received Web service request is an ASMX Web service request 108A, the routine 200 proceeds from operation 204 to operation 206. At operation 206, the URL rewriter 112 modifies the ASMX Web service request 108A to target the WCF activation file 116B instead of the ASMX activation file 116A. As discussed above, this causes the WCF Web service 118B to handle the ASMX Web service request 108A rather than the ASMX Web service 118A.

From operation 206, the routine 200 proceeds to operation 208 where the URL rewriter provides the modified ASMX Web service request 114 to the Web server application 110 which, in turn, provides the modified ASMX Web service request 114 to the WCF activation file 116B. From operation 208, the routine 200 proceeds to operation 202, described above.

It should be appreciated that although the functionality of the URL rewriter 112 has been described in the context of the legacy ASMX Web service technology and the newer WCF technology, the functionality of the URL rewriter 112 may be applied to any type of Web service technologies that support a compatibility path and URL rewriting in the manner presented herein.

Figure 3:
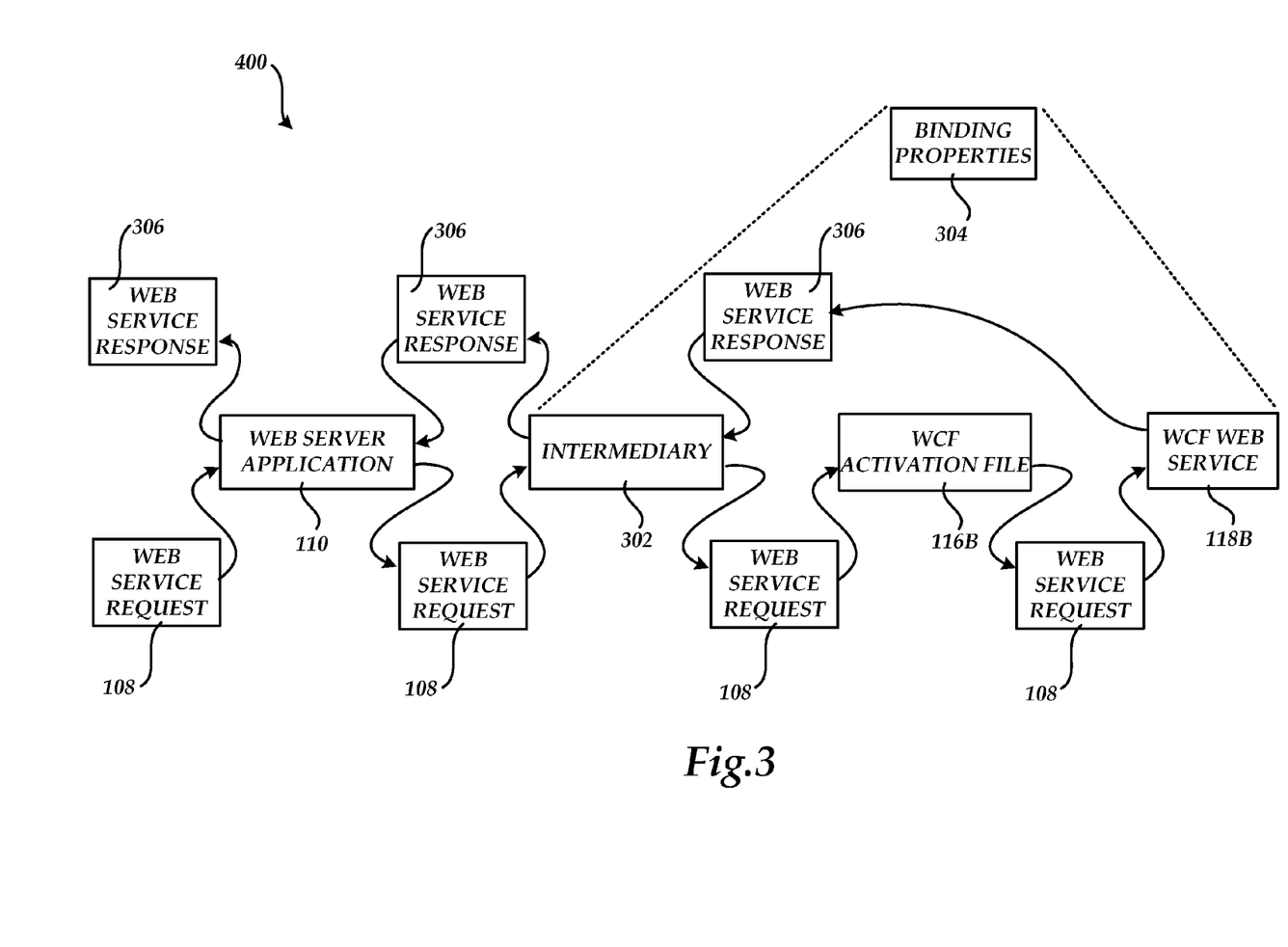
FIG. 3 is a computer network and software architecture diagram showing aspects of the operation of an intermediary provided hereby and utilized in embodiments presented herein.

Referring now to FIG. 3 a computer network and software diagram will be described that shows aspects of the operation of an intermediary 302 provided hereby and utilized in embodiments presented herein. As will be described in greater detail below, the intermediary 302 provides functionality for modifying Web service requests in a manner that minimizes the processing performed on the Web service requests prior to forwarding the requests to a target Web service.

Although not illustrated in FIG. 3, the intermediary 302 may comprise a software component executed by the server computer 104A, the server computer 104B, or another type of server computer. As will be described in greater detail below, the intermediary 302 processes Web service requests prior to forwarding the Web service request to the target Web service in order to reduce the amount of processing performed by the target Web service on the Web service request.

As shown in FIG. 3 and described briefly above, a Web service request 108 may be generated and forwarded to a Web server application 110. The Web service request 108 shown in FIG. 3 may comprise an ASMX Web service request, a WCF Web service request, or a Web service request constructed utilizing another type of Web service technology.

In response to receiving the Web service request 108, the Web server application 110 is configured to provide the Web service request 108 to the intermediary 302. Upon receiving the Web service request 108, the intermediary 302 is configured to identify one or more binding properties associated with the Web service request 108. The binding properties define aspects of the Web service request 108 and the mechanism utilized to transmit the Web service request 108. For instance, the binding properties might define an encoding type for the Web service request, a message version utilized to format the Web service request 108, and the type of transport utilized to transmit the Web service request. The encoding type for the Web service request 108 might include text, binary, and other types of encodings. The message version utilized to format the Web service request 108 may comprise different versions of the Simple Object Access Protocol ("SOAP") or other types of messaging versions and formats.

According to embodiments, the intermediary 302 is also configured to identify binding properties supported by the target Web service. In the example shown in FIG. 3, for instance, the target Web service is the WCF Web service 118B. In this example, the intermediary 302 is configured to identify the binding properties supported by the WCF Web service 118B. For instance, the intermediary 302 may identify the encoding supported by the WCF Web service 118B, the message versions supported by the WCF Web service 118B, and the transport types supported by the WCF Web service 118B. The transport types might include, for instance, the transmission control protocol ("TCP"), hypertext transport protocol ("HTTP"), a WCF named pipe binding, or another type of transport mechanism.

Once the binding properties associated with the Web service request 108 and the WCF Web service 118B have been identified by the intermediary 302, the intermediary 302 is further configured to identify binding properties 304 for use when forwarding the Web service request 108 to the WCF Web service 118B. In one implementation, the binding properties 304 are selected as to minimize the processing performed on the Web service request by the WCF Web service 118B. For instance, in one embodiment, the intermediary 302 might select binding properties 304 in order to avoid causing the intermediary 302 to re-encode the Web service request 108 prior to processing. Similarly, the intermediary 302 might select the binding properties 304 (e.g. encoding and message version) in a manner as to avoid requiring a conversion of the Web service request 108 to a different message version.

As a more particular example, the Web service request 108 might be formatted using text encoding and the SOAP 1.1 message version. If the intermediary 302 determines that the WCF Web service 118B supports text encoding and the SOAP 1.1 message version, then the binding properties 304 will be selected to include the SOAP 1.1 message version and text encoding. In this manner, the Web service request 108 can be forwarded directly to the Web service 118B without processing by the intermediary 302 or the WCF Web service 118B. If, however, the WCF Web service 118B only supports the SOAP 1.2 message version or does not support text encoding, then the intermediary 302 will select binding properties 304 most compatible with the binding properties supported by the WCF Web service 118B. Moreover, as will be described in detail below, the intermediary 302 will also convert the Web service request 108 for use with the selected binding properties 304. In this example, the intermediary 302 might convert the Web service request 108 to a SOAP version supported by the WCF Web service 118B or re-encode the Web service request 108 in an encoding type supported by the WCF Web service 118B. Additional details regarding this process will be provided below.

Once the intermediary 302 has selected a binding that has the requested binding properties 304 and processed the Web service request 108, the intermediary 302 provides the Web service request 108 to the target Web service. In the implementation shown in FIG. 3, a WCF activation file 116B is utilized to target the WCF Web service 108B. Accordingly, the WCF activation file 116B is utilized to identify and instantiate the target WCF Web service 118B. In response to receiving the Web service request 108, the WCF Web service 118B performs the processing requested by the Web service request 108 and generates a Web service response 306. The Web service response 306 is the response to the Web service request 108.

In response to receiving the Web service response 306, the intermediary 302 performs processing on the Web service response 306 in order to ensure that the Web service response 306 is compatible with the calling Web service client application. For instance, if the intermediary 302 converted the Web service request 108 between message versions or to utilize a different encoding, the intermediary 302 will perform a reverse conversion on the Web service response 306 prior to providing the Web service response 306 to the Web server application 110. When the Web server application 110 receives the Web service response 306 from the intermediary 302, the Web server application 110 provides the Web service response 306 to the calling Web service client application as a response to the original Web service request 108. Additional details regarding this process will be provided below with respect to FIG. 4.

Figure 4:
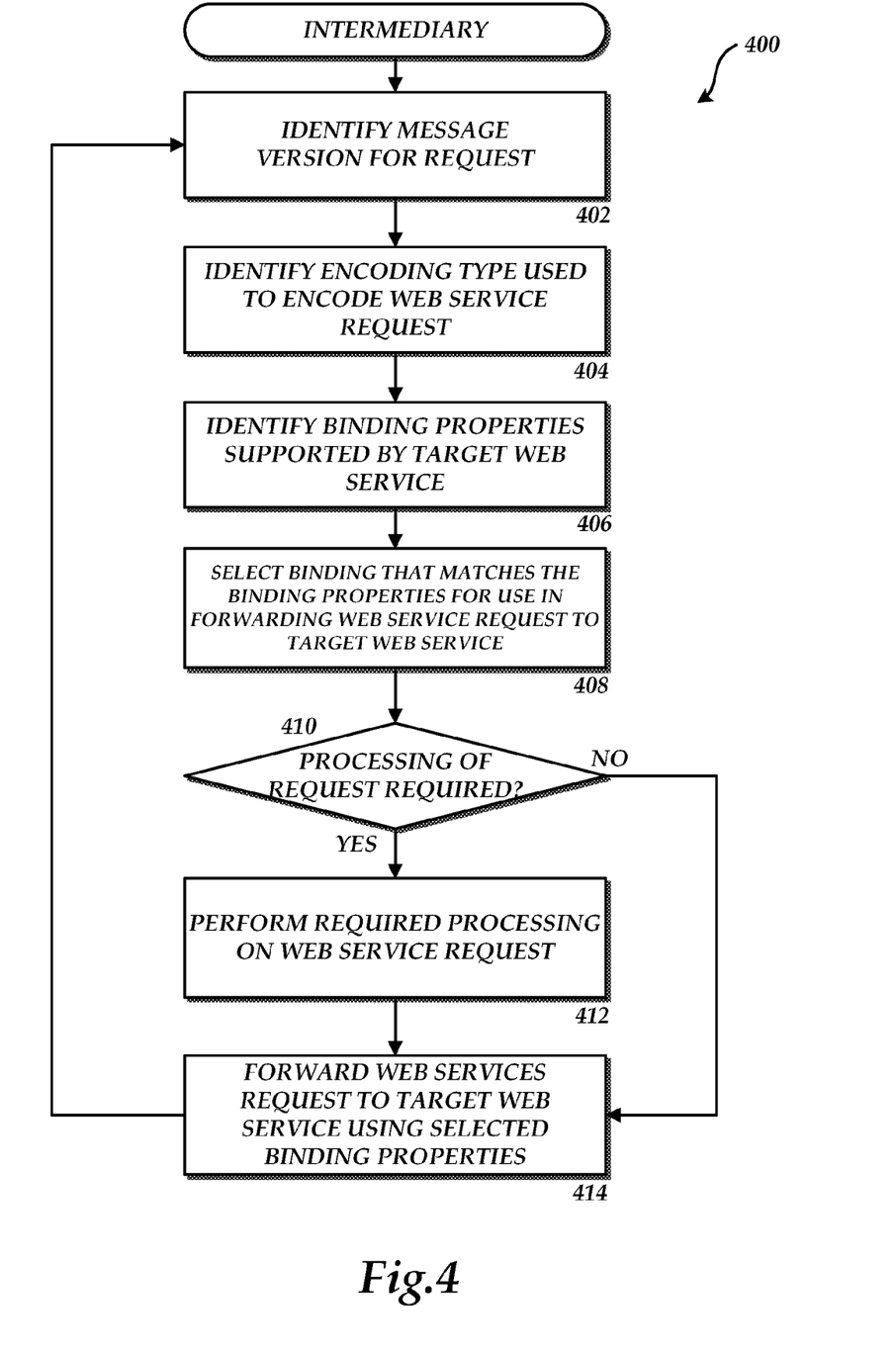
FIG. 4 is a flow diagram showing aspects of the operation of an intermediary according to one embodiment presented herein.

Turning now to FIG. 4, an illustrative routine 400 will be described that illustrates the operation of intermediary 302 according to one embodiment presented herein. The processing shown in FIG. 4 is performed by the intermediary 302 in response to receiving a Web service request 108 from a Web service client application, such as the ASMX Web service client application 106A or the WCF Web service client application 106B.

The routine 400 begins at operation 402 where the intermediary 302 identifies the message version for the received Web service request. As discussed above, the message version might comprise a SOAP message version or a message version utilized by another type of protocol. The routine 400 then proceeds to operation 404, where the intermediary 302 identifies the encoding type utilized to encode the received Web service request. As also discussed above, the encoding type might include binary encoding, text encoding, or another type of encoding known to those skilled in the art. It should be appreciated that although the message version and encoding type are described herein as illustrative binding properties, the intermediary 302 may be configured to identify other binding properties associated with a Web service request in a similar fashion.

From operation 404, the routine 400 proceeds to operation 406 where the intermediary 302 identifies binding properties supported by the target Web service 118. As discussed above, the intermediary 302 might be configured to identify the message version, encoding types, and transports supported by the Web service targeted by the received Web service request. Once the binding properties associated with the Web service request 108 and the targeted Web service have been identified, the routine 400 proceeds to operation 408.

At operation 408, the intermediary 302 selects a binding with the requested binding properties 304 for use in forwarding the received Web service request to the target Web service. As discussed above, in one implementation a binding is selected having binding properties 304 that minimize the processing of the Web service request 108 prior to forwarding the Web service request to the Web service. For instance, as discussed above, a binding may be selected with binding properties 304 that minimize the need to convert the Web service request 108 between message versions or encoding types.

Once the intermediary 302 has selected the binding properties 304, the routine 400 proceeds to operation 410, where the intermediary 302 determines whether processing of the Web service request 108 is needed. For instance, depending on the binding properties 304 that have been selected, the intermediary 302 may convert the Web service request 108 to another message version or encoding type. If such processing is not needed, the routine 400 proceeds from operation 410 to operation 414. If processing of the Web service request 108 is needed, the routine 400 proceeds from operation 410 to operation 412.

At operation 412, the intermediary 302 performs the processing on the Web service request 108. For instance, as discussed above, the intermediary 302 might convert the Web service request 108 between message types or to a different form of encoding. Once the processing has been completed by the intermediary 302, the intermediary 302 forwards the processed Web service request to the target Web service utilizing the selected binding properties 304. From operation 414, the routine 400 proceeds to operation 402, described above.

Figure 5:
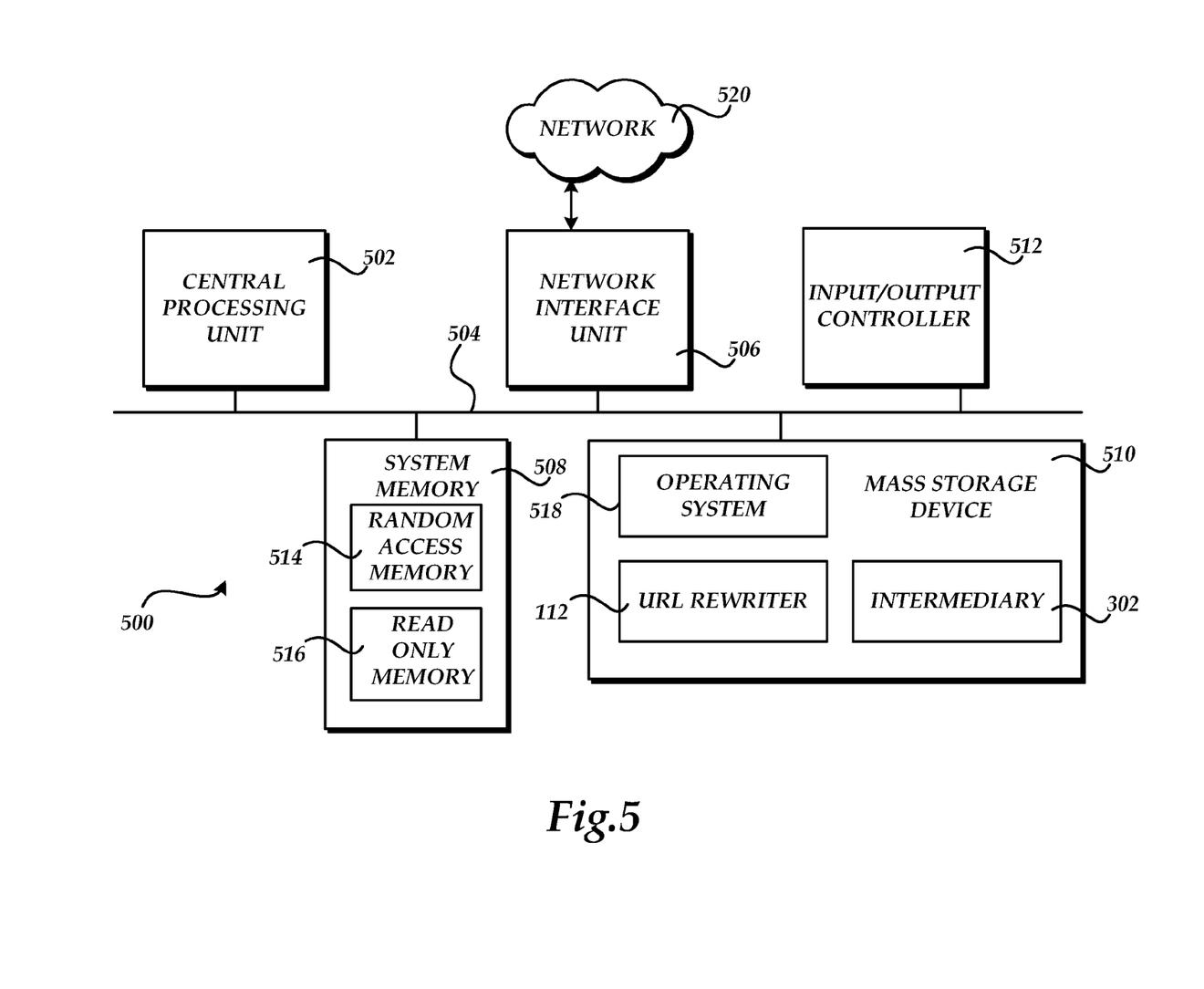
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for optimized routing in the manner presented above. The computer architecture shown in FIG. 5 illustrates a conventional desktop, laptop, or server computer and may be utilized to execute any aspects of the software components presented herein.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the URL rewriter 112 and the intermediary 302, each of which was described in detail above with respect to FIGS. 1-4. The mass storage device 510 and the RAM 514 may also store other types of program modules and data.

It should be appreciated that the software components described herein may, when loaded into the CPU 502 and executed, transform the CPU 502 and the overall computer 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the computer 500 may comprise other types of computing devices, including hand-held computers, embedded computer systems, personal digital assistants, and other types of computing devices known to those skilled in the art. It is also contemplated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for processing Web service requests are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for processing a Web service request, the computer-implemented method comprising performing computer-implemented operations for:
   receiving a Web service request;
   determining in response to receiving the Web service request whether the Web service request targets an activation file for a first Web service constructed according to a first Web service technology or an activation file for a second Web service constructed according to a second Web service technology;
   in response to determining that the Web service targets an activation file for the first Web service, modifying the Web service request such that it targets the activation file for the second Web service by identifying one or more binding properties associated with the Web service request, identifying one or more binding properties supported by the second Web service and selecting, based upon the binding properties associated with the Web service request and the binding properties supported by the second Web service, a binding for use in forwarding the Web service request to the second Web service; and
   forwarding the Web service request to the second Web service using the selected binding.

2. The computer-implemented method of claim 1, wherein the binding properties for use in forwarding the Web service request to the second Web service are selected to minimize processing of the Web service request prior to forwarding the Web service request to the second Web service.

3. The computer-implemented method of claim 1, wherein the Web service request is constructed according to the first Web service technology.

4. The computer-implemented method of claim 3, wherein the first Web service technology comprises Active Server Methods X (ASMX).

5. The computer-implemented method of claim 4, wherein the second Web service technology comprises WINDOWS Communication Foundation (WCF).

6. The computer-implemented method of claim 1, wherein the binding properties define an encoding type for the Web service request.

7. The computer-implemented method of claim 6, wherein the binding properties further define a message version for the Web service request.

8. The computer-implemented method of claim 7, wherein the binding properties further define a transport utilized to forward the Web service request to the Web service.

9. A system for processing Web service requests, the computer system comprising:
   a computer system configured to execute a uniform resources locator (URL) rewriter, the URL rewriter configured to receive a Web service request directed to a first Web service, the Web service request constructed according to a first Web service technology and targeting an activation file for the first Web service constructed according to the first Web service technology and, in response to receiving the Web service request, to modify the Web service request to target an activation file for a second Web, service constructed according to a second Web service technology; and
   a computer system configured to execute an intermediary, the intermediary configured to identify one or more binding properties associated with the Web service request and one or more binding properties supported by the second Web service, to select one or more binding properties for use in forwarding the Web service request to the second Web service based upon the binding properties associated with the Web service request and the binding properties supported by the second Web service, the binding properties selected to minimize processing of the Web service request by the second Web service, and to forward the Web service request to the second Web service using a binding having the selected binding properties.

10. The system of claim 9, wherein the binding properties define an encoding type for the Web service request.

11. The system of claim 10, wherein the binding properties further define a message version for the Web service request.

12. The system of claim 11, wherein the binding properties further define a transport utilized to forward the Web service request to the Web service.

13. The system of claim 12, wherein the Web service request is constructed according to a first Web service technology.

14. A computer-readable storage medium that is not a signal having computer-readable instructions stored thereupon which, when executed by a Computer, cause the computer to:
   receive a Web service request directed to a Web service, the Web service request constructed using Active Server Methods X (ASMX) and targeting an activation file for a first Web service constructed using Active Server Methods X (ASMX);

in response to receiving the Web service request, to modify the Web service request to target an activation file for a second Web service constructed using WINDOWS Communication Foundation (WCF);

identify one or more binding properties associated with the Web service request and one or more binding properties supported by the second Web service;

select, based upon the binding properties associated with the Web service request and the binding properties supported by the second Web service, a binding for use in forwarding the Web service request to the second Web service, the binding being selected to minimize processing of the Web service request by the second Web service; and to forward the Web service request to the second Web service using the selected binding.

15. The computer-readable storage medium of claim 14, wherein the binding properties define an encoding type for the Web service request.

16. The computer-readable storage medium of claim 15, wherein the binding properties further define a message version for the Web service request.

17. The computer-readable storage medium of claim 16, wherein the binding properties further define a transport utilized to forward the Web service request to the Web service.

* * * * *